United States Patent
Osaki

(10) Patent No.: US 11,853,560 B2
(45) Date of Patent: Dec. 26, 2023

(54) CONDITIONAL ROLE DECISION BASED ON SOURCE ENVIRONMENTS

(71) Applicant: Hitachi, Ltd., Tokyo (JP)

(72) Inventor: Hiroyuki Osaki, Los Gatos, CA (US)

(73) Assignee: HITACHI, LTD., Tokyo (JP)

( * ) Notice: Subject to any disclaimer, the term of this patent is extended or adjusted under 35 U.S.C. 154(b) by 203 days.

(21) Appl. No.: 17/402,230

(22) Filed: Aug. 13, 2021

(65) Prior Publication Data

US 2023/0047320 A1 Feb. 16, 2023

(51) Int. Cl.
*G06F 3/06* (2006.01)

(52) U.S. Cl.
CPC .......... *G06F 3/0622* (2013.01); *G06F 3/0605* (2013.01); *G06F 3/067* (2013.01); *G06F 3/0629* (2013.01); *G06F 3/0659* (2013.01)

(58) Field of Classification Search
CPC .... G06F 3/0622; G06F 3/0605; G06F 3/0629; G06F 3/0659; G06F 3/067
See application file for complete search history.

(56) References Cited

U.S. PATENT DOCUMENTS

| | | | |
|---|---|---|---|
| 9,300,660 B1 | 3/2016 | Borowiec et al. | |
| 2007/0143601 A1* | 6/2007 | Arroyo | G06F 21/6218 713/172 |
| 2020/0097872 A1* | 3/2020 | Hirsch | G06Q 10/06312 |
| 2021/0406391 A1* | 12/2021 | Philip | H04L 63/105 |

OTHER PUBLICATIONS

Li, Ninghui, John C. Mitchell, and William H. Winsborough. "Design of a role-based trust-management framework." Proceedings 2002 IEEE Symposium on Security and Privacy. IEEE, 2002. (Year: 2002).*
Covington, Michael J., et al. "Securing context-aware applications using environment roles." Proceedings of the sixth ACM symposium on Access control models and technologies. 2001. (Year: 2001).*
Wang, Chun-Dong, Ting Li, and Li-Chun Feng. "Context-aware environment-role-based access control model for web services." 2008 International Conference on Multimedia and Ubiquitous Engineering (mue 2008). IEEE, 2008. (Year: 2008).*

* cited by examiner

*Primary Examiner* — Nicholas J Simonetti
(74) *Attorney, Agent, or Firm* — Procopio, Cory, Hargreaves & Savitch LLP

(57) ABSTRACT

Example implementations can involve a system, which can involve a server configured to distribute role decision condition expressions created based on user input to one or more storage devices; and the one or more storage devices, which can involve a processor, configured to, for receipt of a request, determine user identification information, request source environment information and requested contents from the request; determine a role from the role decision condition expressions based on the user identification information and request source environment information; and determine whether or not the request can be executed based on the role.

14 Claims, 12 Drawing Sheets

CONDITIONAL ROLE DECISION BASED ON SOURCE ENVIRONMENTS

BACKGROUND

Field

The present disclosure is generally directed to Information Technology (IT) systems, and more specifically, for security management for storage device application programming interfaces (API) on storage devices.

Related Art

IT systems can include storage devices and applications. Applications run on servers. Servers are connected to storage devices. Storage devices have API to facilitate remote management. API request can involve operation requests such as data creation or data deletion in the storage devices.

In the related art, the storage device API is requested not by humans, but rather software-like applications on behalf of humans. Due to frequent API access, security has become more important. For example, spoofing attack may destroy data in storage devices by calling an API improperly, as illustrated in the left portion of FIG. 1.

For security, both authentication and authorization are required. Authentication is used to identify the requester of the API. For example, some authentication system enforces users to use a special token which is issued for each requester when accessing an API, as illustrated in the center portion of FIG. 1 Authorization is a method to check the requester's permissions and limit the request executability accordingly. For example, when users belong to some organization, the authorization should handle API requests so that the request will not inadvertently delete storage device resources like pools or volumes outside the organization, as illustrated in the right portion of FIG. 1.

Storage administrators managing responsibility over such IT systems need to maintain the security level with appropriate configurations for authentication and authorization. They also need to keep the IT system updated, even when delivering timely authorization configurations without any impact on the user.

In the related art, there are systems and methods that involve providing authorization and authentication in a cloud for a user of a storage array. In such implementations, the authentication server is an independent service from storage devices. User request access can be transferred toward the authentication server. Authentication server can publish tokens including authorization information.

SUMMARY

Aspects of the present disclosure can involve a system, which can involve a server configured to distribute role decision condition expressions created based on user input to one or more storage devices; and the one or more storage devices, each of the one or more storage devices involving a processor, configured to, for receipt of a request, determine user identification information, request source environment information and requested contents from the request; determine a role from the role decision condition expressions based on the user identification information and request source environment information; and determine whether or not the request can be executed based on the role.

Aspects of the present disclosure can involve a system, which can involve a server configured to distribute role decision condition expressions created based on user input to one or more storage devices; and the one or more storage devices, each of the one or more storage devices involving, for receipt of a request, means for determining user identification information, request source environment information and requested contents from the request; means for determining a role from the role decision condition expressions based on the user identification information and request source environment information; and means for determining whether or not the request can be executed based on the role.

Aspects of the present disclosure can involve a method for a system having a server configured to distribute role decision condition expressions created based on user input to one or more storage devices; and the one or more storage devices, the method involving for receipt of a request, determining user identification information, request source environment information and requested contents from the request; determining a role from the role decision condition expressions based on the user identification information and request source environment information; and determining whether or not the request can be executed based on the role.

DETAILED DESCRIPTION

Figure 1:
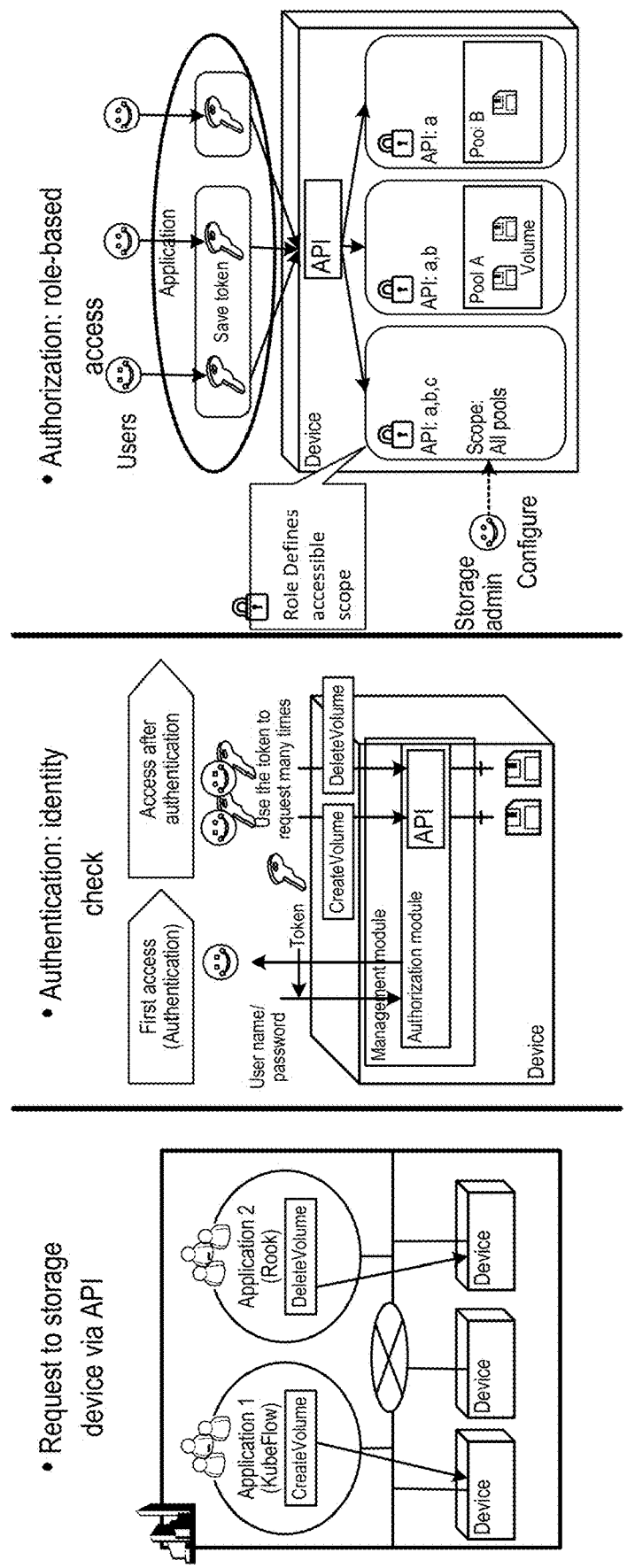
FIG. 1 illustrates an example storage device API and required authentication and authorization.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Related art implementations assume that each user only has one associated authorization information. Authorization checks thereby only require user identification (ID), and it does not depend on the environment (servers) or timing.

Figure 2:
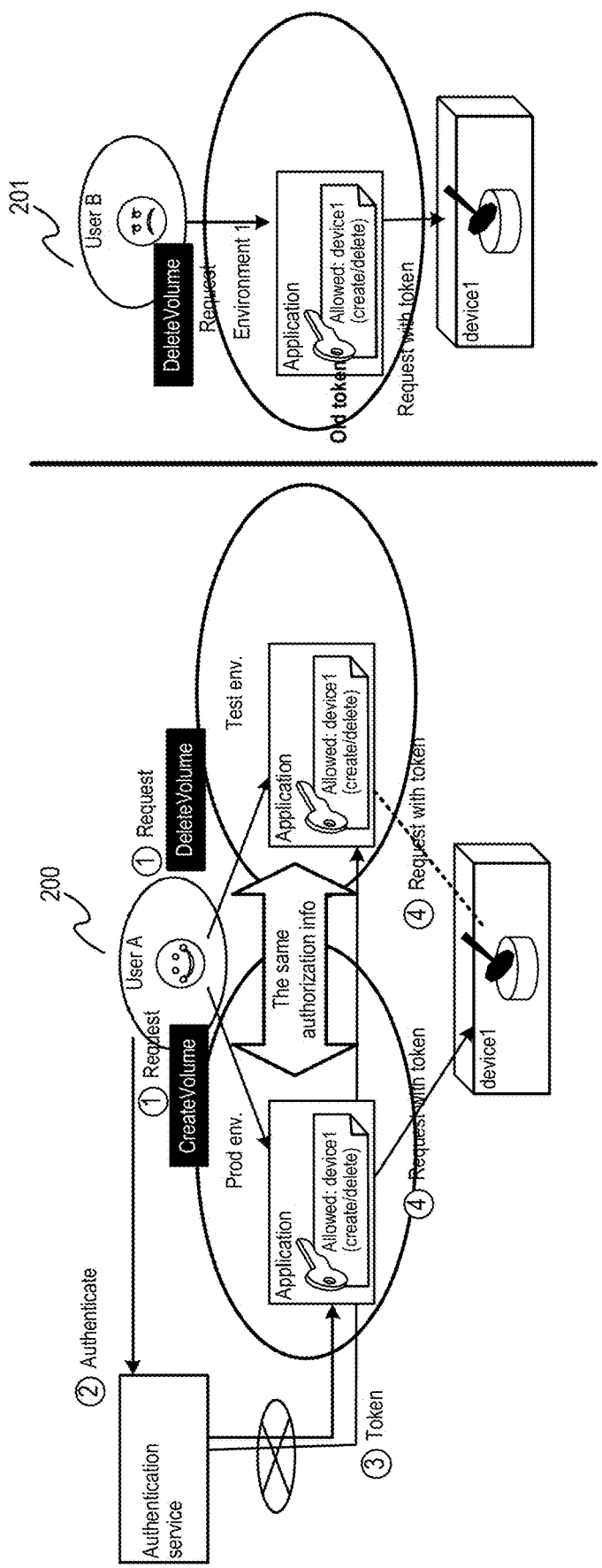
FIG. 2 illustrates example target use cases and issues of the related art implementations.

However, such related art implementations encounter problems in systems for which authorization depends not only on user ID, but environments and timing as well. An IT system frequently has multiple environments as illustrated in FIG. 2. FIG. 2 illustrates example target use cases and issues of the related art implementations.

These environments must have different authorization settings. User A shown in example execution 200 of FIG. 2 uses multiple environments (production environment and test environment) and run applications on them which requires storage device API execution. Sometimes, a storage administrator wants the user to have different authorization settings on each of the production environment and the test environment.

When an application of user A accesses a storage device device1 from the production environment, device1 returns an OK for the authorization. On the other hand, when another application of user A accesses the storage device API from the test environment, device1 returns a rejection in response to the same request. The kind of authorization often comes from business requirements in order to save the critical data.

Further these authorization settings can change dynamically. For example, in the example execution 201, suppose the storage administrator wants User B in FIG. 2 to have a different authorization setting after some event. Before the event, User B has access to certain data on the storage device. However, after the event, User B should lose access to the same data. The storage administrator should reflect this kind of dynamic change to many storage devices to preserve data security in response to dynamic business change.

Related art authorization implementations have the following issues. Firstly, they cannot handle multiple environments requiring different authorization information. The authorization method in prior art has the following two issues. Related art techniques applied to FIG. 2 will result in User A in example execution 200 having only one associated authorization information after using the same authentication service. Further, such related art implementations cannot handle dynamic change of multiple environment authorization.

When the storage admin wants User B in example execution 201 of FIG. 2 to have a different authorization after an event, User B continues to use the old token fetched from the authentication service. This token will not reflect the change from the storage administrator.

The example implementation described herein involves a role decision system to address the above issues. In this system, storage devices have a role decision unit that can receive the user identifier and source environment information as input, interpret condition expressions, and decide a role based on this information. With this role decision condition expression, the storage administrator can set up different authorization for different environments. Further, the systems described herein involves a distribution server that distributes said condition expressions to many storage devices. With this distribution server, the storage administrator can change authorization and reflect it to many storage devices in timely manner.

Figure 3:
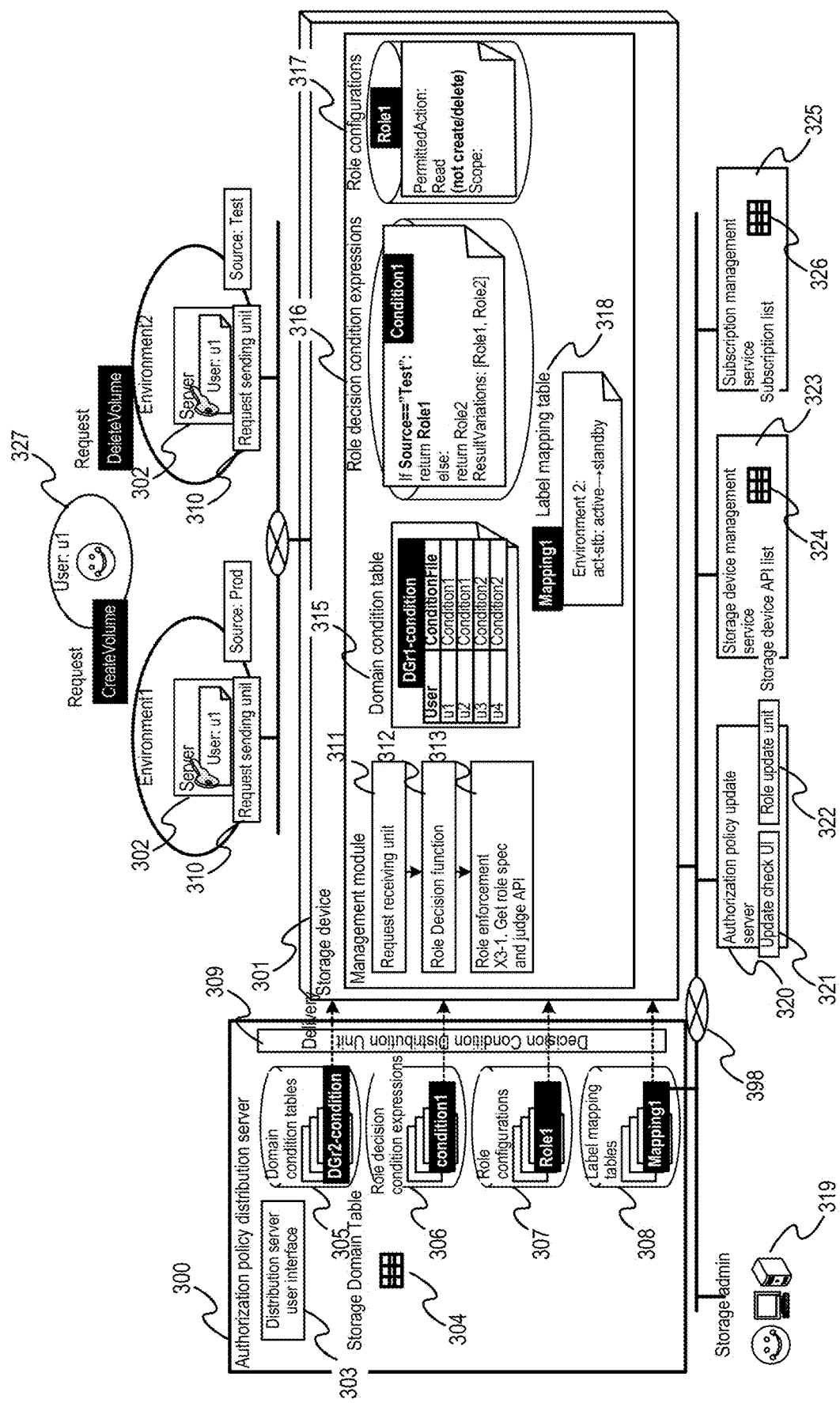
FIG. 3 illustrates the overall architecture, in accordance with an example implementation.

FIG. 3 illustrates the overall architecture, in accordance with an example implementation. As is illustrated in FIG. 3, there is a role decision system which has a role decision condition distribution unit that distributes role decision condition expressions created based on user input to the storage device and storage devices equipped with a request receiving unit that receives requests and acquires user identification information, request source environment information and request contents from the request, a role decision unit that determines the role using the role decision condition expression based on the user identification information and request source information, and a role enforcement part that judges whether or not the request can be executed based on the role.

The role decision system includes authorization policy distribution server 300, storage device 301, and servers 302. Authorization policy distribution server 300 and storage devices 301 can communicate each other on network 398. Storage devices 301 and servers 302 can communicate each other on network 399. Authorization policy distribution server 300 has distribution server user interface 303, storage domain table 304, domain condition tables 305, role decision condition expressions 306, role configuration 307, label mapping tables 308 and condition distribution function 309. Server 302 includes request sending unit 310. Storage devices 301 include request receiving unit 311, role decision unit 312, role enforcement unit 313, domain condition table 315, role decision condition expressions 316, role configurations 317, and label mapping table 318. Domain condition tables 315, role decision condition expressions 316, role configurations 317, and label mapping table 318 are respectively subset of domain condition tables 305, role decision condition expressions 306, role configurations 307, and label mapping table 308 in authorization policy distribution server 300.

Storage administrator terminal 319, authorization policy update server 320, storage device management service 323, and subscription management service 325 are connected to authorization policy distribution server 300 and storage devices 301 and can communicate with each other. Authorization policy update server 320 includes update check user interface (UI) 321 and role update unit 322. Storage device management service 323 includes storage device application programming interface (API) list 324. Subscription management service 325 includes subscription list 326. In this system, storage administrator can use access to authorization policy distribution server 300 and authorization policy update server 320 via storage administrator terminal 319. Further each user can access servers 302 via user terminals 327.

Role decision unit 312 can be located outside management module of storage device 301. In this case, 312 role decision unit can connect to network 399, and each component in storage device 301 can communicate with role decision unit 312 over the network 399.

Figure 4:
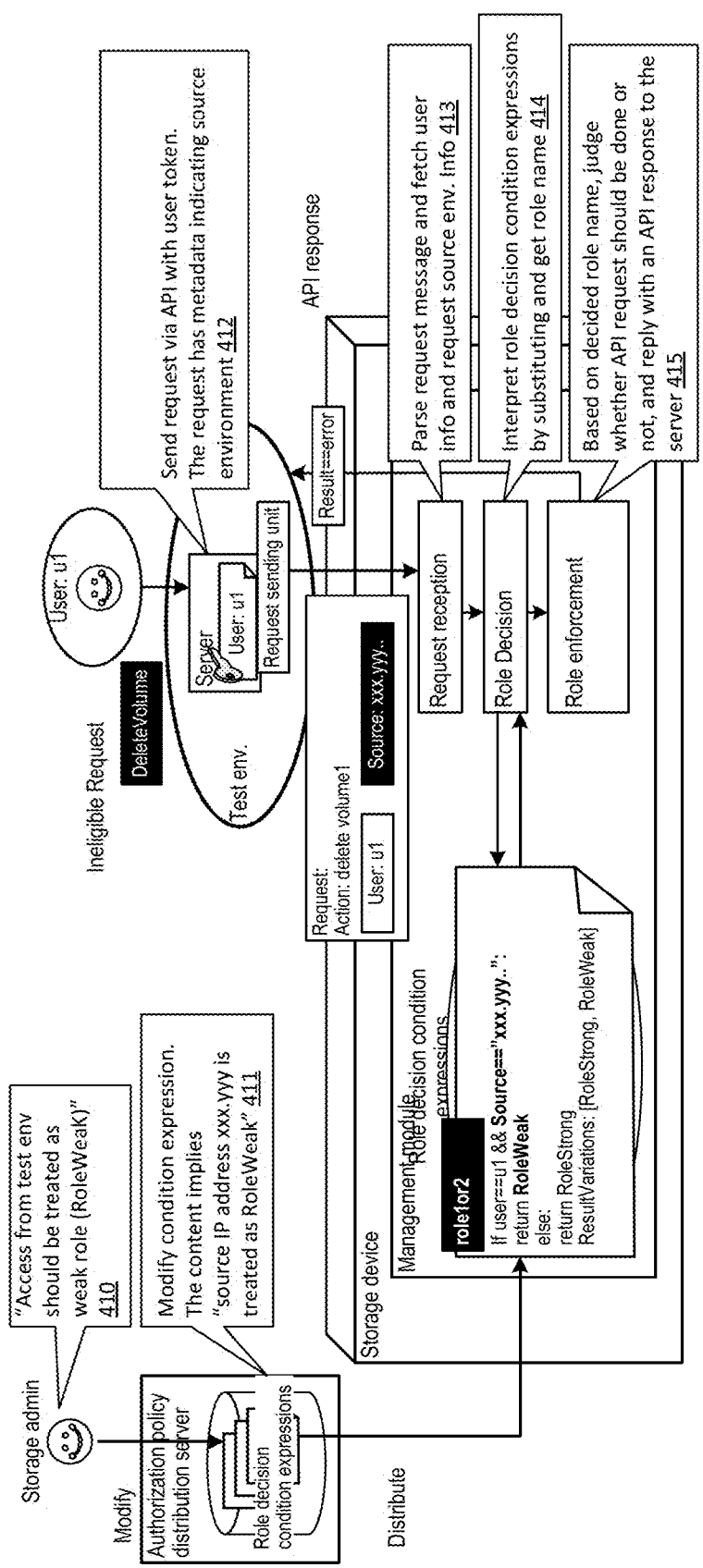
FIG. 4 illustrates an example of API request, in accordance with an example implementation.

FIG. 4 illustrates an example of API request 401, in accordance with an example implementation. API request 401 contains an action and target resource. For example, a request "action: delete, target resource: volume1" means the requested action is "delete" and target resource of the action is "volume1".

FIG. 4 also shows an example of distribution process flow between authorization policy distribution server 300 and storage device 301. In step 411, authorization policy distribution server 300 receives a configuration modification request from a storage administrator. This modification request includes update difference for information in authorization policy distribution server. For example, the message 410 can indicate that "user u1 's access from test environment should be treated as weak role (RoleWeak)". This update contents can be created in distribution server user interface 303 (further details described in FIG. 6). Next, in step 411, authorization policy distribution server 300 updates role decision condition expressions 306 so that role decision condition expressions align with said modification request. For example, a role decision condition expression named "role1or2" can be updated as "If user==u1 && Source=="xxx.yyy . . . ": return RoleWeak". This update contains condition expression that the request which comes from test environment with IP address "xxx.yyy . . . " and is sent by user u1. This update also contains a decision result such as RoleWeak. This update means that when an API request meets the condition expression, the decision result will be applied by step 414 described later. Decision condition distribution unit 309 distributes updated information to corresponding storage devices. Decision condition distribution unit 309 searches storage domain table 304 and domain condition table 305 for the corresponding storage device (further details will be described in FIG. 9). After update information is sent to storage devices 301, the storage devices 301 receive update information and store them into corresponding data among 315-318. In one example implementation, authorization policy distribution server 300 can distribute label mapping table 308 to storage devices 301 when label mapping table 308 is updated (further details described in FIG. 7 and FIG. 8). In another implementation, authorization policy distribution server 300 can distribute role configuration 307 to storage devices 301 when role configuration 307 is updated (details described in FIG. 10 and FIG. 11).

FIG. 4 also shows API request process flow between server 302 and storage device 301. In step 412, user "u1" 327 has server 302 create an API request toward storage device 301. For example, User "u1" 327 can access some user interface provided by 302 server and order to create the API request. This API request can include a token describing that the API requester is "u1". 310 request sending unit sends API request with user token. The API request has metadata named as the request source environment information indicating which source environment is sending the API request. For example, the request source environment information can be IP address of request sender unit 310, which is globally unique to each of the request sender unit. In another case, the request source environment information can be a unique name assigned to each server (e.g., not necessary to put the metadata explicitly, but it can be attached as packet header automatically by request sending unit 310).

In step 413 a management module in storage device 301 receives the API request from server 302. Request receiving unit 311 in the management module parses the API request and gets the user ID and requests source environment information.

In step 414 role decision unit 312 in the management module loads and interprets role decision condition expression 316 by substituting the user ID and the request source environment information. As a result, role decision unit 312 gets a role name. For example, when user ID is "u1" and request source environment information is "xxx.yyy . . . ", role decision condition expression "role1or2" can be interpreted that a result role is going to be "RoleWeak". Then, role decision unit 312 gets "RoleWeak" as a result (details described in FIG. 5).

In step 415 based on the decided role name, role enforcement unit 313 judges whether the original API request sent by user 327 should be executed or not based on role configuration 317. Each of role configuration 317 describes permitted actions and target resources. If the role configuration says that "RoleWeak" is accessible to requested resource in storage device, the response will be "Result==success". Otherwise, the response will be "Result==error".

Figure 5:
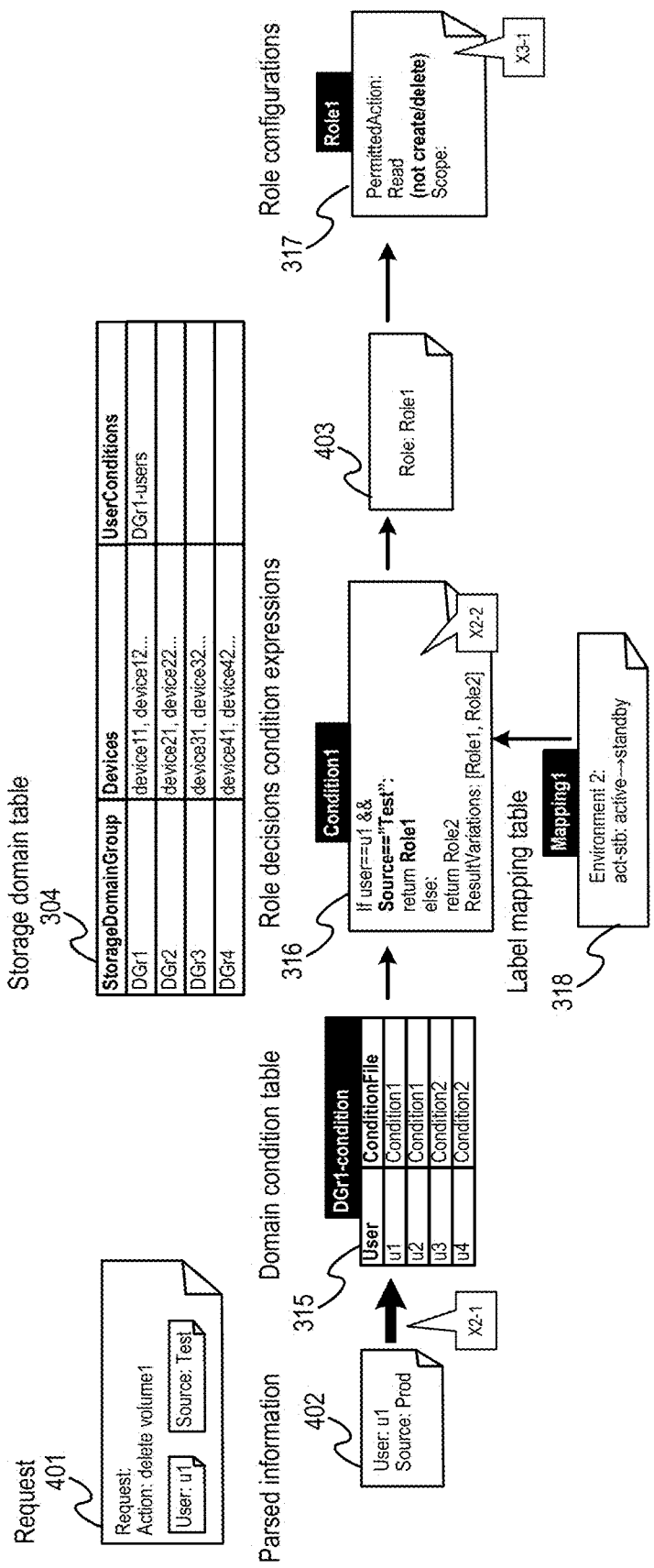
FIG. 5 illustrates tables and messages communicated between units, in accordance with an example implementation.

FIG. 5 illustrates tables and messages communicated between units, in accordance with an example implementation. Request 401 will be sent from server 302 to storage device 301. Request 401 includes user information such as user ID and request source information. The request source information can be the internet protocol (IP) address of request sending unit 310. Or the request source information can be some string information identical to server 301. Using the request source information, request receiving unit identifies the server 301 that sent the message.

Parsed information 402 is created by request receiving unit 311 in storage device 301. Parsed information 402 contains user ID and request source information originally attached to the request 401. Then role decision unit 312 use parsed information 402 and identifies a condition expression name in user-condition table 315. 315 Domain condition table 305 includes columns such as user ID and condition expression name. Using this condition expression name, role decision unit 312 loads a specified role decision condition expression 316. Role decision unit 312 interprets this content using the previously parsed user ID and request source information and gets the result of the role 403. For example, role decision condition expression 316 can indicate that if user ID is "u1" and the request source information is "Test", then this storage device should treat the user as a role named "Role1". Result of the role 403 can include one or more role names.

Using the result of the role 403, role enforcement unit 313 judges whether the original request can be done or not. Result of the role 403 points to role configuration 317. Role configurations 317 can describe what actions are permitted for the role and the permitted scope of the actions. For example, role enforcement unit 313 checks whether the original request such like "delete volume" can be permitted for role "Role1". If this result is true, role enforcement unit 313 can execute the original request to internal storage device functions to accomplish the request. Finally, role enforcement unit 313 creates an API response describing whether the API was done or not and return it to request sending unit 310.

Role decision unit 312 can use label mapping table 318 to identify labels which is assigned to the request source information. For example, a request source can be assigned a label "act-stb: standby".

Storage domain table 304 includes columns for storage domain group name, devices, and domain conditions. Storage domain group is a group including multiple storage devices. So the column of devices contains an array of storage device ID. The column of domain conditions contains an ID specifying one of the role decision condition expressions 316.

In this implementation, role configuration 307 and role decision condition expressions 316 can describe a rule utilizing additional request message information other than request source environment information. For example, role decision condition expressions 316 can use target tenant information ("Tenant", "Namespace" etc). It is supposed that one storage device can keep multiple tenants dedicated for different business usages from users 327. User 327 can create a resource such as a volume in a tenant "tenantA" inside a device "device1" and, at the same time, this user can create another resource in a different tenant "tenantB" in the same device "device1". So user 327 can specify the target tenant in API request 401. If so, request receiving unit 311 can parse the request and get the target tenant name. Then role decision unit 312 can use this target tenant name during interpreting role decision condition expression 316. This method allows storage admins to govern fine-grained role assignment and tenant isolation in one device.

Figure 6:
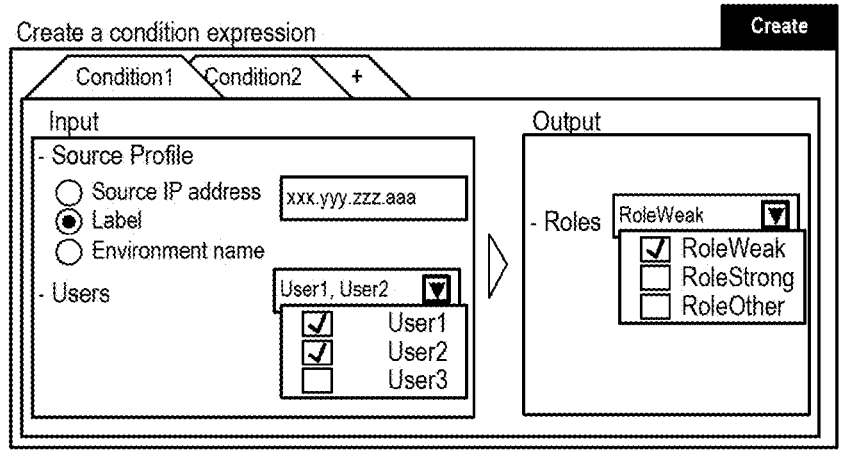
FIG. 6 illustrates examples of distribution server user interface, in accordance with an example implementation.
Figure 6:
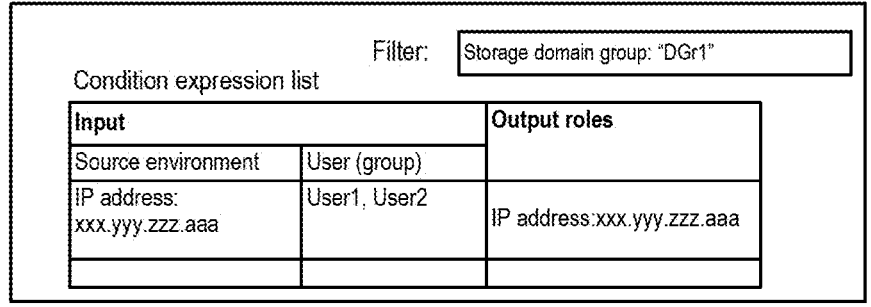

FIG. 6 illustrates examples of distribution server user interface 303, in accordance with an example implementation. Distribution server user interface 303 can modify information inside authorization policy distribution server 300 such as role decision condition expressions 316. Interface 303a shows an example to create a new role decision condition expression. Further, one role decision condition expression can include multiple condition settings. User interface 303a contains multiple condition settings. One condition setting contains forms allowing users to specify input and output. In input pane, storage administrator 319 can select source profile type from "Source IP address", "Label", and "environment name" and can specify target user ID with pull-down box. In output pane, storage administrator 319 specifies role names for the user access in the condition specified in input pane.

In another user interface example 303b, a condition expression list is illustrated in one view. This view contains a list including columns for request source environment information, user ID and output roles. Each row of the list shows a condition expression. This UI can also implement a filter function to select records in a condition user specifies.

Figure 7:
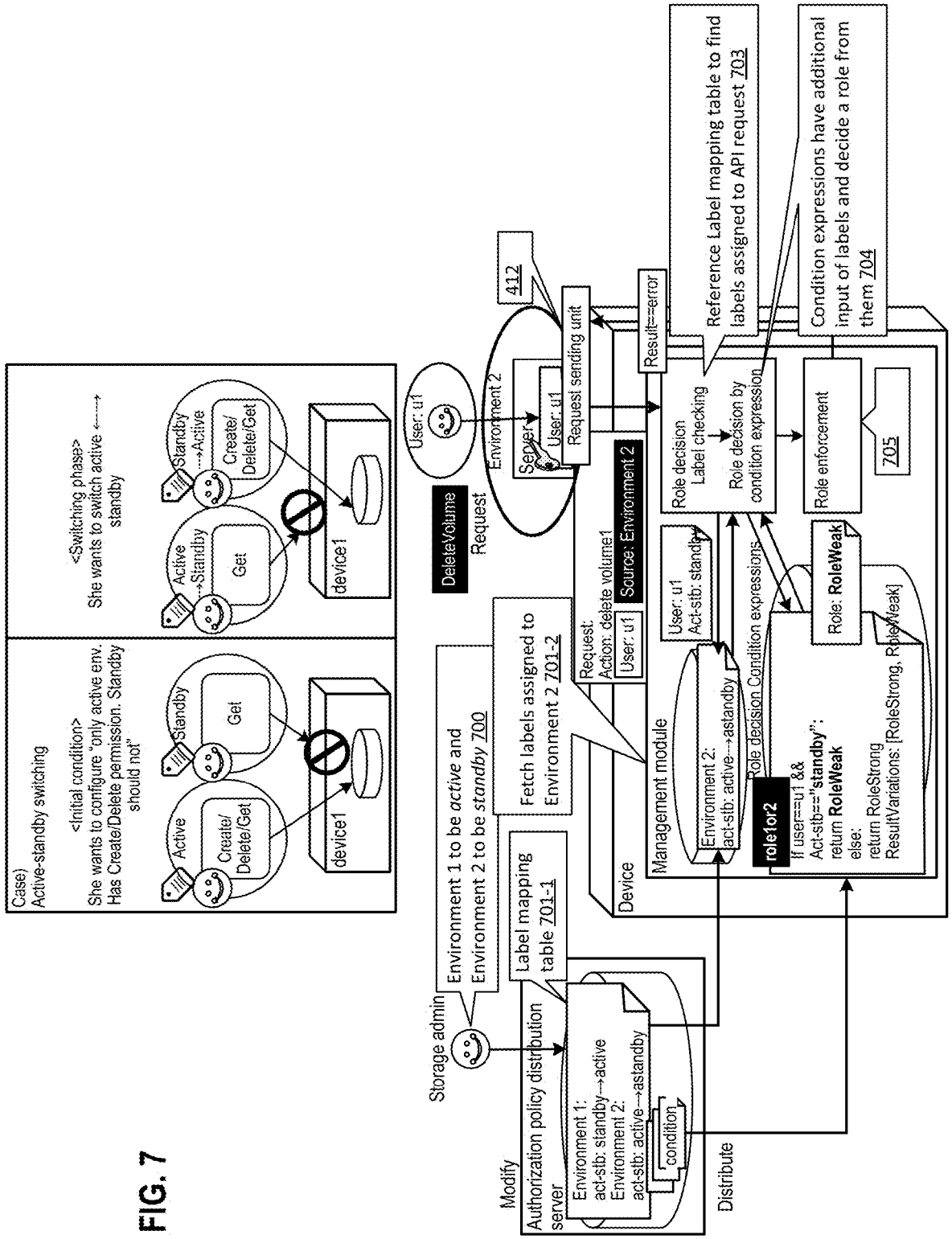
FIG. 7 illustrates the second example of a distribution process flow, in accordance with an example implementation.

FIG. 7 illustrates the second example of a distribution process flow, in accordance with an example implementation. This flow enables storage administrator 319 to dynamically change storage device behaviors without changing role decision condition expressions 306. For example, IT systems have two environments of identical configuration for high availability in case of hardware failure. Once a hardware failure occurs, this kind of IT systems switches environment label "standby" to "active" and on the other hand "active" to "standby". By using labels instead of static information of request source such as IP address, the storage administrator can change behaviors in each environment with simple label distribution.

As illustrated in FIG. 7, there is a role decision system in which the decision condition distribution unit distributes the label mapping table which maps request source information to labels. The role decision unit refers to the label mapping table and finds labels from request source information, which determines the role using the role decision condition expression based on the user identification information and the labels.

As FIG. 7 shows, storage administrator 319 has two environments (labeled as "Active" and "Standby"). Storage administrator 319 makes users in one environment labeled "Active" have a stronger role as an initial condition. Next, storage administrator 319 changes it to a weaker role because of policy change at 700.

In step 701-1 and 701-2, authorization policy distribution server 300 has label mapping table 308, which is the same as label mapping table 318 shown in FIG. 5. For example, label mapping table has a row which says "Environment 2" has a label of "act-stb: active". 319 storage admin changes this label to "act-stb: standby". After this update, 309 decision condition distribution unit sends 308 label mapping table to 301 storage devices.

In step 703 of API request process flow, role decision unit 312 additionally loads label mapping table 318 and gets labels assigned to request source environment. In step 704, role decision unit 312 also interprets role decision condition expression 316 by substituting the user ID and the labels for environment. As a result, role decision unit 312 gets a role name. For example, when user ID is "u1" and request source environment label is "act-stb: standby", role decision condition expression "role1or2" can be interpreted that a result role is going to be "RoleWeak". Then role decision unit 312 gets "RoleWeak" as a result.

In step 705, based on the decided role name, role enforcement unit 313 judges whether the original API request sent by user 327 should be done or not. This result will be changed after the label changes.

Figure 8:
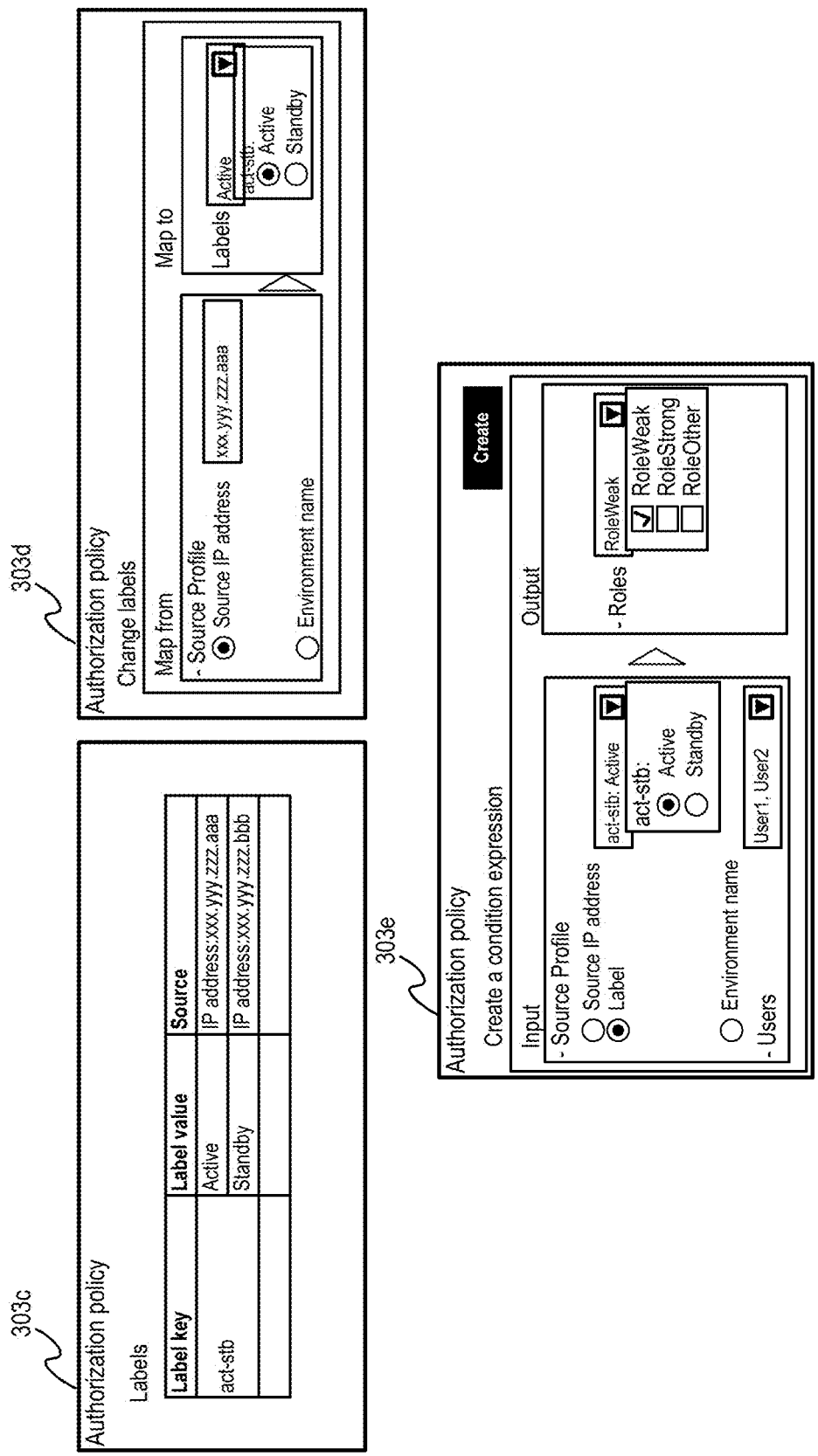
FIG. 8 illustrates examples of distribution server user interface to allow users to modify label mapping tables, in accordance with an example implementation.

FIG. 8 illustrates examples of distribution server user interface 303 to allow users to modify label mapping tables 308, in accordance with an example implementation. Interface 303c shows a list of labels. Storage administrator 319 can view all of the label mapping rules. Each label mapping rule has label key, label value and source condition. For example, label key "act-stb" and label value "Active" will be assigned to source IP address "xxx.yyy.zzz.aaa". Interface 303d shows an example UI for changing labels. This UI has "Map from" pane and "Map to" pane. In "Map from" pane, storage administrator 319 specifies target source profile such as source IP address. In "Map to" pane, storage administrator 319 specifies result label key-value pair from pull-down box. Interface 303e shows a UI for creating a condition expression using these labels. Storage administrator 319 can select usable source profile of "Input" as "Labels" and select label key-value pair.

Figure 9:
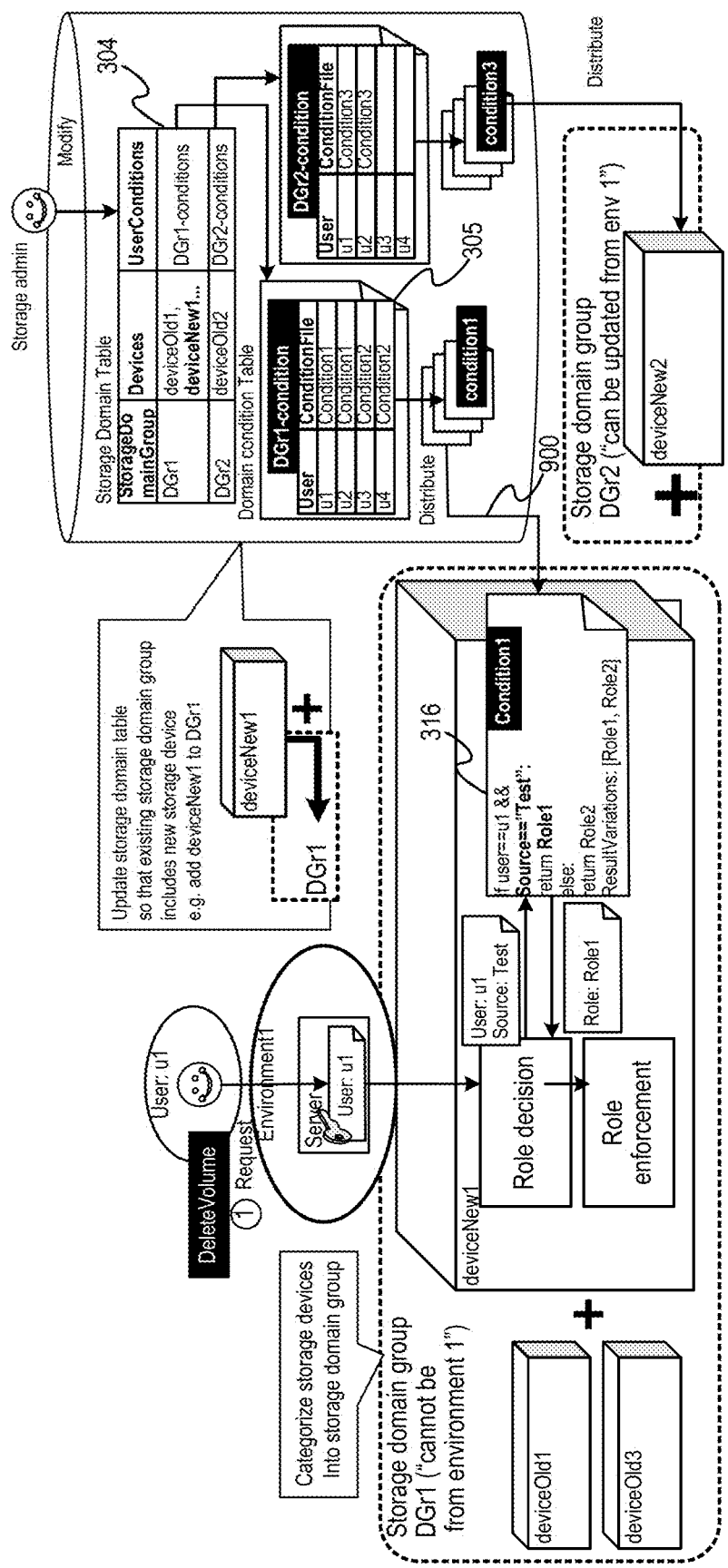
FIG. 9 illustrates an example of selective distribution procedure using storage domain table and condition table, in accordance with an example implementation.

FIG. 9 illustrates an example of selective distribution procedure using storage domain table 304 and condition table 305, in accordance with an example implementation. As illustrated in FIG. 9, the decision condition distribution unit has a storage domain group table, and distributes all role decision condition expressions which belongs to a storage domain group to only storage devices which belongs to storage domain group. Storage domain table 304 categorizes many storage devices into one storage domain group. For example, storage domain group "DGr1" has devices "deviceOld1" and "deviceNew1". Further, the devices in one group are treated so that they have the same authorization policy information. Storage domain table 304 maps each storage domain group to domain condition table 305. Next, each domain condition table 305 includes all condition expression names which addresses required in the role decision condition expression 316. In distribution process, decision condition distribution unit 309 detects all target devices and required role decision condition expressions from storage domain table and send these files to all target devices. For example, role decision condition expressions "condition1" and "condition2" are sent to storage devices "deviceOld1" and "deviceNew1" which belongs to storage domain group "DGr1".

In this example procedure, authorization policy distribution server 300 can distribute role configurations 307 to a storage domain table as shown at 900. Each role decision condition expression 316 can include all result role candidates. For example, role decision condition expression "condition1" can be included.

In this example procedure, the interface 303b has a list of configuration files from FIG. 3 that can show only records of a storage domain group. In this case, the filter function in 303b allow storage administrators to input a storage domain group name into textbox. Further, this filter function should reference storage domain table 304 and domain condition table 305.

Figure 10:
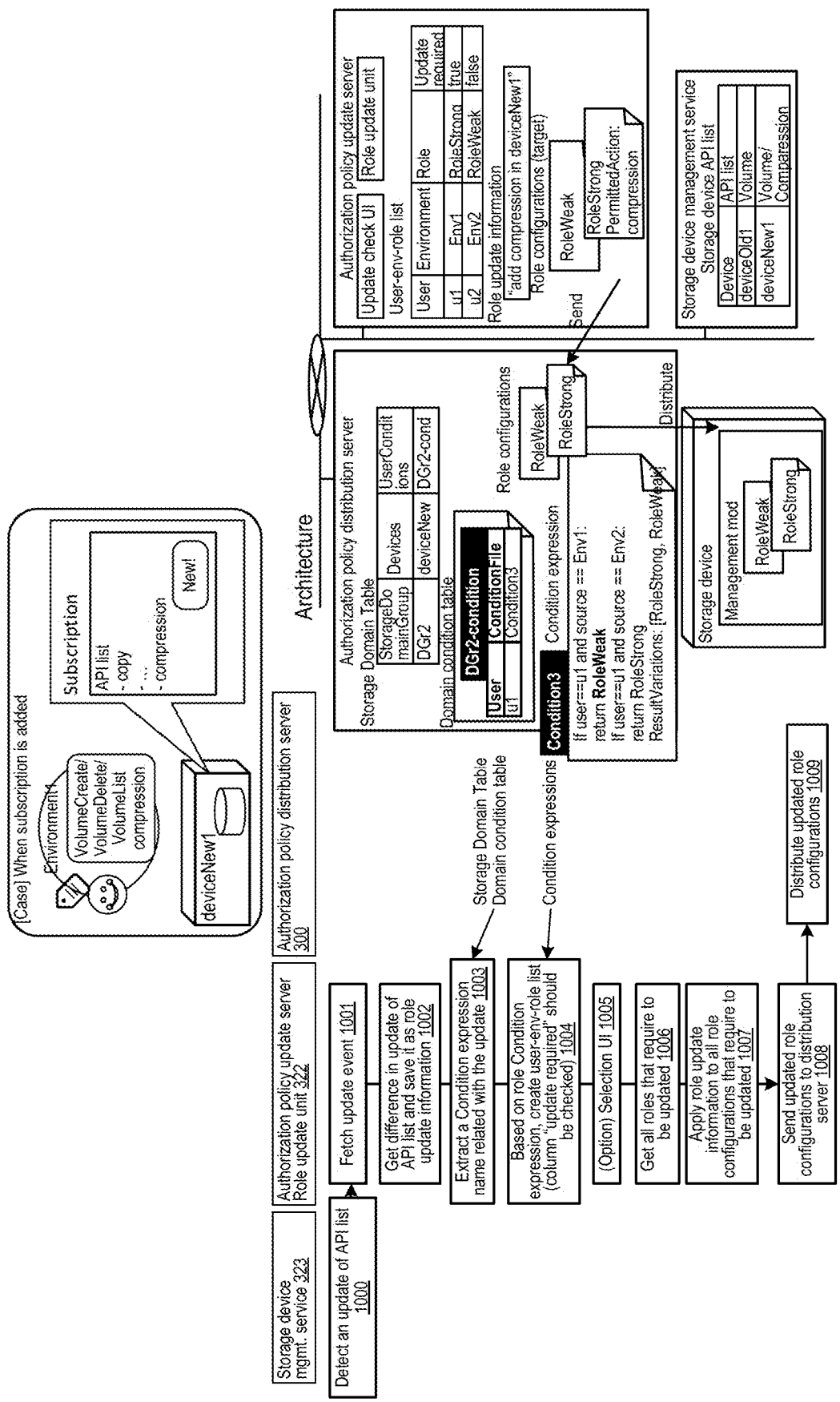
FIG. 10 illustrates an example of role updating process flow, in accordance with an example implementation.

FIG. 10 illustrates an example of role updating process flow, in accordance with an example implementation. As illustrated in FIG. 10, there is an application table which includes one or more application connection information user list generation units which accesses to applications based on application table and generates user list on applications, a device API list generation unit which accesses storage devices and generates an API list, and decision condition expression generation unit which creates role condition distribution expressions based on users list and API list. Using this flow, storage administrator 319 can permit users to use new capabilities of storage device API. For example, there can be a situation in which the storage administrator updates storage device software and add new capabilities. Another situation can involve making a new subscription contract.

As illustrated in FIG. 10, storage administrator 319 has a new subscription that includes an available API list. "Compression" is a newly available API of the device "deviceNew1".

Storage device management service 323 can include storage device API list 324. First, storage device management service 323 watches storage device API list 324 and detects an update of the list at 1000. Storage device management service 323 notifies authorization policy update server 320. Role update unit 322 in authorization policy update server 320 fetches the update event 1001, and finds the difference in the API list. For example, the difference is like "add compression in deviceNew1". Role update unit 322 saves it as a role update information for later usage at 1002.

Next, role update unit 322 extracts a condition expression name related with the update at 1003. When update includes "deviceNew1", role update unit 322 searches storage domain table 304 for "deviceNew1" and finds storage domain condition table name "DGr2". Role update unit 322 also lists up all condition expressions in the found domain condition table name "DGr2". Role update unit 322 looks into all condition expressions.

Next, role update unit 322 creates user-env-role list based on role condition expressions at 1004. For example, a condition expression "condition3" includes some conditional rule as follows, "if user==u1 and source==Env1: return RoleWeak;
if user==u1 and source==Env2: return RoleStrong;"

This conditional rule means that user "u1" can be treated as the role "RoleWeak" for the request from request source "Env1". In the other case, user "u1" can be treated as the role "RoleStrong about the request from request source "Env2". These conditional rules can be translated into a list of all combinations of input of user/source environment and output candidate of the role. In FIG. 3, the user-env-role list shows an example of the translated list. Role update unit 322 creates this list from some targeted role decision condition expressions. Initially, column "Update required" in user-env-role list are initialized to "true", which means all these rows are targets of later role update process.

Next, as an optional process, role update unit 322 can show update check UI 321 to storage administrator 319 in order for storage administrator 319 to select executable update candidates explicitly at 1005. Update check UI 321 can modify values of the column "update required" in user-env-role list.

Then, role update unit 322 gets all role configurations that are specified as "update required: true" in user-env-role list at 1006. Role update unit 322 reflects the difference of the role update information onto all role configurations marked "update required" at 1007. If the role "RoleStrong" is marked as "update required", the description of "compression" will be added into "permittedAction" field of the role configuration. This means that a user with this role can now have permission to use new API "compression". After all required role configurations are updated, role update unit 322 sends them to distribution server at 1008.

Authorization policy distribution server 300 distributes updated role configurations to servers 302 in the way as described herein at 1009.

Figure 11:
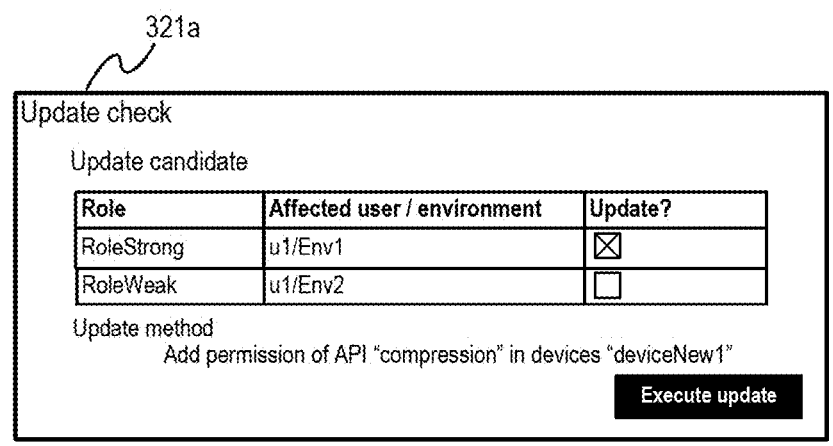
FIG. 11 illustrates an example of update check UI, in accordance with an example implementation.

FIG. 11 illustrates an example of update check UI 321a, in accordance with an example implementation. Storage administrator 319 can check all candidates of roles and pairs of affected user and environment. Such information is equivalent to the user-env-role list which was created by the role update unit 321 in the previous role updating process. Storage administrator 319 can also select roles as "update required" or unselect. In this view, storage administrator 319 can control whether the role should be updated or not later. Further, update check UI 321a provides how these roles are updated. Update check UI 321a shows the role update information created by role update unit 321 as "update method". Storage administrator 319 can check the contents and approve it by clicking a button "Execute update".

Figure 12:
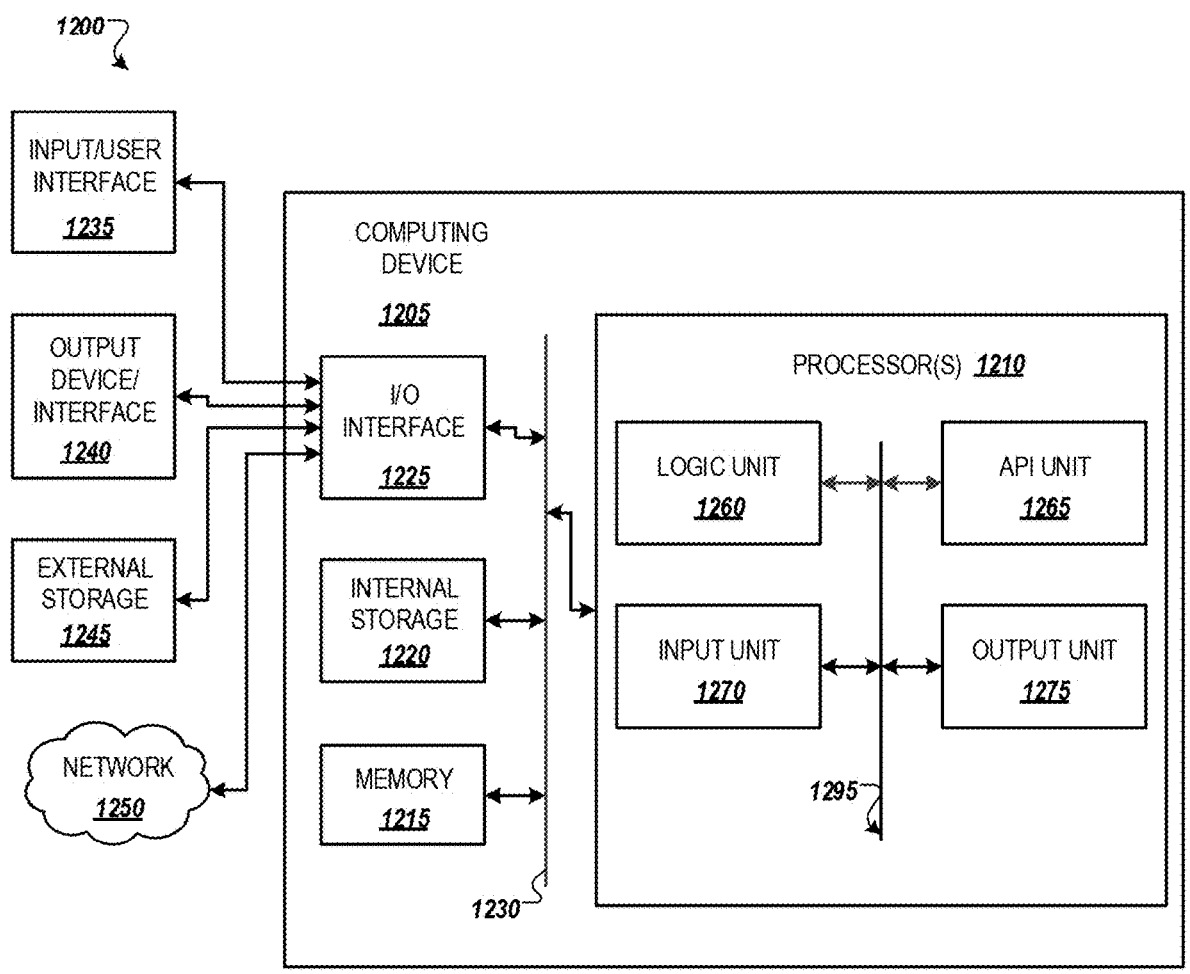
FIG. 12 illustrates an example computing environment with an example computer device suitable for use in some example implementations.

FIG. 12 illustrates an example computing environment with an example computer device suitable for use in some example implementations, such as a server as described herein or a storage controller to control the storage devices as described herein. Computer device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and/or IO interface 1225, any of which can be coupled on a communication mechanism or bus 1230 for communicating information or embedded in the computer device 1205. IlO interface 1225 is also configured to receive images from cameras or provide images to projectors or displays, depending on the desired implementation.

Computer device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via I/O interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, input unit 1270, output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide output based on the calculations described in example implementations.

In example implementations as described in FIG. 3 using a platform as illustrated in FIG. 12, there can be a system involving a server configured to distribute role decision condition expressions created based on user input to one or more storage devices; and the one or more storage devices, each of the one or more storage devices having a processor, configured to, for receipt of a request, determine user identification information, request source environment information and requested contents from the request; determine a role from the role decision condition expressions based on the user identification information and request source environment information; and determine whether or not the request can be executed based on the role.

In example implementations as described in FIG. 7 using a platform as illustrated in FIG. 12, the server is configured to distribute a label mapping table which maps request source environment information to labels; wherein the processor is configured to reference the label mapping table to determine labels from the request source environment information; and determine the role from the role decision condition expressions based on the user identification information and said labels.

In example implementations as described in FIG. 9 using a platform as illustrated in FIG. 12, the server is configured to manage a storage domain group table and distribute the role decision condition expressions which belongs to a storage domain group to only ones of the one or more storage devices belonging to the storage domain group.

In example implementations as described in FIG. 9 using a platform as illustrated in FIG. 12, for installation of a new storage device to the one or more storage devices, the server is configured to: not assign the new storage device to the storage domain group; and for receipt of a configuration to assign the new storage device to the storage domain group, distribute role decision condition expressions to the new storage device based on the user input. Through such example implementations, the domain group defines the boundary to which device role condition is applied. Initially, a new device belongs to no group, so no condition expression is distributed. The user request to the new device is mapped to no role (no permission) in default setup. Through such example implementations, unintended access to new device can be prevented. Only after the storage administrator declares that the new device belongs to a storage domain, then condition expressions are deployed and user requests are allowed.

In example implementations as illustrated in FIG. 10 using the platform of FIG. 12, the server can involve a memory configured to manage an application table; and another processor configured to: access one or more applications based on the application table to generates user list for the one or more applications; access the one or more storage devices to generate an application programming interface (API) list; and generate the role condition distribution expressions based on the user list and the API list.

As illustrated in FIG. 4 using the platform of FIG. 12, the role decision condition expressions involving logic expressions for determining role names based on a user and a source environment combination; wherein the processor is configured to determine whether or not the request can be executed based on the role by: determining the user from the user identification information and the source environment from the source environment information; executing the logic expressions to determine a corresponding one of the role names from a combination of the determined user and determined source environment; wherein the processor is configured to determine whether or not the request can be executed based on the role by: referencing the corresponding one of the role names in role configuration information to determine permissions for the request.

In example implementations as illustrated in FIGS. 3 to 7, the source environment information is indicative of one or more of a source internet protocol (IP) address, a hostname, a domain name, or a node name in a server cluster.

In example implementations as illustrated in FIG. 3 and FIG. 10 using the platform as illustrated in FIG. 12, for an update to storage contract information of the one or more storage devices or to an application programming interface (API) list, the server is configured to regenerate and redistribute role decision condition expressions to the one or more storage devices. Through such example implementations, it is thereby possible to regenerate the conditional judgment file and roles when either the storage contract information or device API information is updated.

Through the example implementations described herein, storage administrators can control access by not only user ID but also request source information. Such example implementations allow storage administrators to configure fine-grained and dynamic access control depending on both various environments and timing. The example implementations described herein reduce management cost by unifying access control plane into one distribution server. The example implementations described herein further enhances security by consistent configuration without user's manual labor, such as manual reauthentication and token refreshment.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A system, comprising:
    a server configured to distribute role decision condition expressions created based on user input to one or more storage devices; and
    the one or more storage devices, each of the one or more storage devices comprising:
        a processor, configured to, for receipt of a request:
            determine user identification information, request source environment information and requested contents from the request;
            determine a role from the role decision condition expressions based on the user identification information and the request source environment information; and determine whether or not the request can be executed based on the role,
wherein, for an update to storage contract information of the one or more storage devices or to an application programming interface (API) list, the server is configured to regenerate and redistribute the role decision condition expressions to the one or more storage devices to regenerate a conditional judgment file and roles when the storage contract information or device API information is updated to enable storage administrators to control access by the user identification information and by request source environment information.

2. The system of claim 1, wherein the server is configured to distribute a label mapping table which maps the request source environment information to labels;
wherein the processor is configured to:
reference the label mapping table to determine the labels from the request source environment information;
determine the role from the role decision condition expressions based on the user identification information and the labels.

3. The system of claim 1, wherein the server is configured to manage a storage domain group table and distribute the role decision condition expressions which belongs to a storage domain group to only ones of the one or more storage devices belonging to the storage domain group.

4. The system of claim 3, wherein for installation of a new storage device to the one or more storage devices, the server is configured to:
not assign the new storage device to the storage domain group; and
for receipt of a configuration to assign the new storage device to the storage domain group, distribute the role decision condition expressions to the new storage device based on the user input.

5. The system of claim 1, wherein the server comprises:
a memory configured to manage an application table; and
another processor configured to:
access one or more applications based on the application table to generates user list for the one or more applications;
access the one or more storage devices to generate the API list; and
generate the role condition distribution expressions based on the user list and the API list.

6. The system of claim 1, wherein the role decision condition expressions comprises logic expressions for determining role names based on a user and a source environment combination,
wherein the processor is configured to determine whether or not the request can be executed based on the role by:
determining the user from the user identification information and the source environment from the source environment information;
executing the logic expressions to determine a corresponding one of the role names from a combination of the determined user and determined source environment; and
referencing the corresponding one of the role names in role configuration information to determine permissions for the request.

7. The system of claim 1, wherein the source environment information is indicative of one or more of a source internet protocol (IP) address, a hostname, a domain name, or a node name in a server cluster.

8. A method for a system comprising a server configured to distribute role decision condition expressions created based on user input to one or more storage devices; and the one or more storage devices, the method comprising:
for receipt of a request:
determining user identification information, request source environment information and requested contents from the request;
determining a role from the role decision condition expressions based on the user identification information and the request source environment information;
determining whether or not the request can be executed based on the role, and
for an update to storage contract information of the one or more storage devices or to an application programming interface (API) list, regenerating and redistributing the role decision condition expressions to the one or more storage devices from the server to regenerate a conditional judgment file and roles when the storage contract information or device API information is updated to enable storage administrators to control access by the user identification information and by the request source environment information.

9. The method of claim 8, further comprising:
distributing, from the server, a label mapping table which maps the request source environment information to labels;
referencing the label mapping table to determine the labels from the request source environment information; and
determining the role from the role decision condition expressions based on the user identification information and the labels.

10. The method of claim 8, further comprising:
managing, by the server, a storage domain group table and distributing the role decision condition expressions which belongs to a storage domain group to only ones of the one or more storage devices belonging to the storage domain group.

11. The method of claim 10, further comprising:
for installation of a new storage device to the one or more storage devices:
not assigning, by the server, the new storage device to the storage domain group; and
for receipt of a configuration to assign the new storage device to the storage domain group, distributing, by the server, the role decision condition expressions to the new storage device based on the user input.

12. The method of claim 8, wherein the server comprises a memory configured to manage an application table; and
wherein the method further comprises:
accessing, by the server, one or more applications based on the application table to generates user list for the one or more applications;
accessing, by the server, the one or more storage devices to generate the API list; and
generating the role condition distribution expressions based on the user list and the API list.

13. The method of claim 8, wherein the role decision condition expressions comprises logic expressions for determining role names based on a user and a source environment combination;
wherein the method further comprises determining whether or not the request can be executed based on the role by:

determining the user from the user identification information and the source environment from the source environment information;

executing the logic expressions to determine a corresponding one of the role names from a combination of the determined user and determined source environment; and referencing the corresponding one of the role names in role configuration information to determine permissions for the request.

14. The method of claim 8, wherein the source environment information is indicative of one or more of a source internet protocol (IP) address, a hostname, a domain name, or a node name in a server cluster.

* * * * *